United States Patent [19]

Steffen

[11] 4,312,454
[45] Jan. 26, 1982

[54] MODULAR CONSTRUCTION ELEMENT FOR BUILDING A PIGEONHOLE-TYPE WALL

[76] Inventor: Carlo Steffen, 16 F, rue de la Fontenette, 1227 Carouge, Switzerland

[21] Appl. No.: 141,155

[22] Filed: Apr. 17, 1980

[30] Foreign Application Priority Data

Apr. 24, 1979 [CH] Switzerland ............ 3813/79

[51] Int. Cl.³ .............. A47B 73/00; A47B 53/00
[52] U.S. Cl. ............................. 211/74; 211/174; 312/198; 312/257 R
[58] Field of Search ............ 211/10, 74, 189, 194, 211/42; 312/257 R, 198, 111, 108; 403/217, 218, 219, 345, 364

[56] References Cited

U.S. PATENT DOCUMENTS

| | | | |
|---|---|---|---|
| 3,812,977 | 5/1974 | Glassman | 211/189 |
| 4,023,681 | 5/1977 | Plant | 312/257 R |
| 4,095,858 | 6/1978 | Hopf | 211/194 |
| 4,247,011 | 1/1981 | Walter | 312/198 |

*Primary Examiner*—Reinaldo P. Machado
*Attorney, Agent, or Firm*—Karl F. Ross

[57] ABSTRACT

A modular construction element for building a pigeonhole wall has planar front and back faces flanking a central plane. A rectangular back panel has upper and lower edges bridged by side edges and is formed along the full length of its lower edge with a 45° chamfer. The front panel is subdivided at a central line intermediate the side edges of the back panel into a right section and a left section. The right section has edges coextensive with the corresponding edges of the back panel. The left section is offset in the direction of the line from the right panel to form a recess and a projecting tab. Such elements can be assembled together without the aid of tools or fastening means to form a vertical wall of horizontally throughgoing pigeonholes of diamond shape.

6 Claims, 12 Drawing Figures

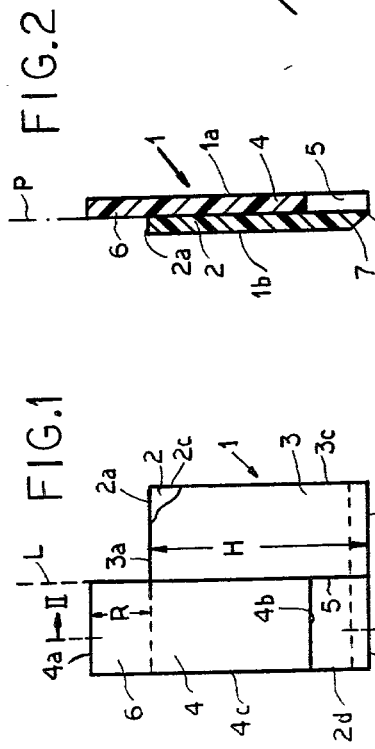

MODULAR CONSTRUCTION ELEMENT FOR BUILDING A PIGEONHOLE-TYPE WALL

FIELD OF THE INVENTION

The present invention relates to a modular construction unit for building a pigeonhole-type wall. More particularly this invention concerns such a wall which can be formed of a multiplicity of identical modular construction elements.

BACKGROUND OF THE INVENTION

It is known to use a pigeonhole-type wall for storing objects, such as books in a library, bottles in a wine cellar, papers in an office, and so on, as well as for use as an architectural screen indoors or outdoors.

Such a pigeonhole-type wall is normally formed of vertical and horizontal construction elements. The horizontal elements must be sufficiently strong to support the items that are intended to be kept in the pigeonholes, but the vertical elements are subjected only to compressive forces so they can be of substantially lighter construction. The standard arrangements normally require several different types of basic modular elements, and normally require fastening devices to secure the structures together. What is more, in the event that the wall must be disassembled and rebuilt elsewhere, it is normally necessary to employ some tools to separate the various parts.

OBJECTS OF THE INVENTION

It is therefore an object of the present invention to provide an improved modular construction element.

Another object is to provide an improved wall formed of such a construction element.

Yet another object is to provide such a modular construction element which can be used to form a wall substantially without the use of anything other than a single basic element, and without the use of fasteners.

SUMMARY OF THE INVENTION

These objects are attained according to the instant invention in a modular construction element which has a planar front face and parallel thereto a planar back face which together flank a median plane between and parallel to the faces. A rectangular back panel defines the back face and lies between the back face and the (medium) plane. This back panel has an upper back-panel edge, a lower back-panel edge generally parallel to the upper back-panel edge, and a pair of parallel side back-panel edges bridging the upper and lower edges. The back panel is formed along the full length of its lower edge with a planar chamfer forming with the median plane an angle of generally 45° open toward the upper back-panel edge. A front panel defines the front face and lies between the front face and the median plane. This front panel is subdivided at a line equidistant between and parallel to the back-panel side edges into a right section and a left section. The right section has right-section upper and lower edges coextensive with the back-panel upper and lower edges between the line and one of the side edges. The left section is geometrically identical to the right section, but offset along the line relative to it so that the left section has an upper left-section edge spaced upwardly beyond the upper back-panel edge and a lower left-section edge spaced upwardly from the lower back-panel edge. Thus a recess is defined between the left-section lower edge, the line, the other side edge, the back-panel lower edge between the line and the other back-panel side edge, and the plane. The left section therefore also defines an upper portion that projects upwardly beyond the back-panel upper edge and is complementary to the recess.

Thus with the system according to the instant invention it is possible to build a wall with all of the construction elements lying at approximately 45° angles to the vertical. Thus each construction element will be largely subjected to compression when something is placed in one of the pigeonholes formed by the construction elements so that, even if these elements are of light-duty construction, they can support relatively large weights.

In such a wall a base board is normally used which is substantially planar and which is formed with a plurality of substantially parallel 90° notches that are spaced apart by distances equal generally to 1.414 times the spacing in the element plane between the upper and lower back-panel edges. These notches each receive the two lower edges of two separate construction elements extending at 90° to each other and 45° to the horizontal. The chamfers of these elements extend at about 90° to the board and at each notch two chamfers flatly abut each other. The projecting portions of the construction elements pass between respective right-section upper and lower edges and are received in respective recesses. Thus the system according to the instant invention can be simply stacked up to form a relatively rigid assembly which can just as easily be taken apart and moved to another location. When the pigeonholes of such an assembly are loaded with objects to be stored or displayed, the assembly holds together even better, as the weight of the objects stored in it will be effective in all directions to hold the various construction elements together.

According to this invention two such construction elements can be joint together into a single integral piece. In such an arrangement they are joined together with the planes of their back and front faces respectively coplanar and with one side edge of one element joined to the other side edge of the other element. Of course, such elements could be triple or quadruple or even larger if desired, depending on the depth of the pigeonhole to be created.

The system according to the instant invention therefore constitutes an almost infinitely expansible modular construction arrangement that forms an attractive diamond-shaped array of pigeonholes. The term "diamond-shaped" meaning that the square or rhombus-shaped configuration has a diagonal perpendicular to the horizontal. The wall itself can be used simply as a screen or a wall divider, or can be used for storage or display. The construction elements themselves can be unitarily cast of a synthetic resin or concrete, or made of wood or wood chips, depending upon the application. The construction elements themselves are all identical for a given size of pigeonhole to be created, although it is possible to provide construction elements whose lengths or widths are multiples of a standard size for forming several extra large pigeonholes or the like in a given array. What is more, the 45° angle discussed above could be converted, as to a 60° angle, for achieving a different artistic effect with the diamond-shaped pigeonholes.

BRIEF DESCRIPTION OF THE DRAWING

FIG. 1 is a front elevational view of a construction element according to this invention;

FIG. 2 is a section taken along line II—II of FIG. 1;

FIG. 3 is a front elevational view of another construction element of this invention;

FIG. 4 is a section taken along line IV—IV of FIG. 3;

FIGS. 5 and 6 are small-scale back and front perspective views of the element of FIGS. 3 and 4;

FIG. 7 is a perspective view of a wall formed with the elements of FIGS. 3-6; and FIGS. 8-12 are largely schematic views illustrating other arrangements according to the instant invention.

SPECIFIC DESCRIPTION

As seen in FIGS. 1 and 2 a construction element according to this invention has a planar front face 1a and a planar back face 1b symmetrically flanking a central plane P. The back face 1b is formed by a rectangular back panel 2 having an upper edge 2a, a lower edge 2b, and a pair of side edges 2c and 2d. At its lower edge 2b the panel 2 is formed with a planar chamfer 7 extending at 45° to the plane P. The front face 1a is formed by a pair of front-panel sections 3 and 4 joined to each other at a line L equidistant between the edges 2c and 2d of the back panel 2. The right-hand section 3 has a top edge 3a and a bottom edge 3b respectively coextensive with the upper and lower edges 2a and 2b between the line L and the side edge 2c. In addition this right section 3 has a side edge 3c coextensive with the edge 2c. The left-hand front-panel section 4 is of identical geometric size and shape as the section 3, having an upper edge 4a, a lower edge 4b and a side edge 4c. This section 4 is, however, offset in the direction of the line L from the section 3 by a distance h equal to between one-third and one-fourth of the overall height H of the section 3 between its edges 3a and 3b. The section 4 therefore forms a recess 5 bounded by the line L and edges 2b, 2d, and 4b, and a projection 6 of identical size and shape. The sections 3 and 4 may be unitary with each other and with the back panel 2, or can simply be integrally connected together.

FIG. 3 shows a substantially identical arrangement, but wherein a double construction element 10 has a back panel 11 and four sections 12-15 forming the front panel and themselves forming recesses 16 and 17 and projections 18 and 19 substantially identical to the recess 5 and projection 6. This arrangement is therefore substantially identical to the arrangement that would be formed by joining an element 1 such as shown in FIGS. 1 and 2 at its side edges 2c and 3c to another such element at its side edges 2d and 4c, with the chamfers 7 together forming a chamfer 9.

As seen in FIG. 7 such construction elements 10 can be assembled together with a base board 20 formed with 90° notches at 21 spaced apart at spacings S equal to cos 45° × H. In such an arrangement the chamfers 9 all extend vertically or perpendicular to the board 20. The projection 18 and 19 are interleaved with the notches formed between the other projections 18 and 19 of crossing elements 10 to make the entire assembly relatively rigid. In such an arrangement the back panels 11 are generally above the sections 12-15 forming the front panels, so that as weight is applied to any of the elements 10 the system will merely be pressed more tightly together.

It is possible as shown in FIG. 8 to assembly the arrangement as an upwardly pointed array, with the sides of the pigeonholes formed extending at 45° to the horizontal. In FIG. 9 a similar upwardly pointed array is formed, but extra-length elements 10' are used along with the standard-length elements 10 to form an arrangement wherein the sides are inclined at 60° to the horizontal. In such an arrangement the pigeonholes are therefore slightly tipped diamonds.

FIG. 10 shows an arrangement that is made with a single board 20 forming an upwardly pointing array. A second such board 22 lying against a vertical wall 23 can be provided as shown in FIG. 11 to form a corner array.

Two ends boards 24 and 25 against respective vertical walls 26 and 27 can be combined as seen in FIG. 12 with a base boar 20 to form a double-sided array. The boards 20, 22, 24 and 25 can themselves be modular, each having a length equal to twice the spacing S, but having offset ends so that some of the grooves 21 will be formed between two boards. Thus the edges of the elements 10 will hold these boards together.

FIG. 12 also shows how some of the elements 10 can be replaced by the extra-long elements 10" so as to form relatively large pigeonholes. Much longer elements could be used to form pigeonholes having sized equal to multiples of the standard size created by the elements 10. As long as all of the parallel elements on a given diagonal are of the same length it is possible to artistically vary the array within wide limits.

Although the discussion above determined "upper", "lower" as well as "right" and "left" sides, it is understood that the arrangement can be in virtually any orientation, and these terms are not intended to be limiting, but merely to facilitate description of the invention.

I claim:

1. A modular construction element for building a pigeonhole wall, said element having:

a planar front face and parallel thereto a planar back face flanking a plane between and parallel to said faces;

a rectangular back panel defining said back face and lying between said back face and said plane, said back panel having an upper back-panel edge, a lower back-panel edge generally parallel to said upper back-panel edge, and a pair of parallel side back-panel edges bridging said upper and lower edges, said back panel being formed along the full length of said lower edge with a planar chamfer forming with said plane an angle of generally 45° open toward said upper back-panel edge;

a front panel defining said front face and lying between said front face and said plane, said front panel being subdivided at a line equidistant between and parallel to said back-panel side edges into a right section and a left section, said right section having right-section upper and lower edges coextensive with said back-panel upper and lower edges between said line and one of said side edges, said left section being geometrically identical to said right section but offset along said line relative thereto, said left section having an upper left-section edge spaced upwardly beyond said upper back-panel edge and a lower left-section edge spaced upwardly from said lower back-panel edge, whereby a recess is defined between said left-section lower edge, said line, the other side edge, said back-panel lower edge between said line and said other side edge and said plane, said left section having an upper portion projecting beyond said back-panel upper edge and complementary to said recess.

2. The element defined in claim 1 wherein said plane is substantially equidistant between said faces.

3. The element defined in claim 2 wherein said panels are unitary.

4. The element defined in claim 1 wherein two such elements are joined together with their planes, back faces, and front faces respectively coplanar and with the one side edge of one element joined to the other side edge of the other panel.

5. The element defined in claim 1 wherein said chamfer extends from said plane to said back face.

6. A pigeonhole wall formed of a plurality of the elements defined in claim 1 and further comprising a substantially planar base board formed with a plurality of substantially parallel and 90° notches spaced apart by distances equal generally to 1.414 times the spacing in said plane between said upper and lower back-panel edges, said elements extending about 45° to said board and said chamfers extending at about 90° to said board, said back panels being generally above the respective front panels, said portions each passing between respective right-section upper and lower edges and being received in respective recesses.

* * * * *